(12) United States Patent
Olavarría Rodríguez-Arango et al.

(10) Patent No.: US 9,151,518 B2
(45) Date of Patent: Oct. 6, 2015

(54) SOLAR CONCENTRATOR PLANT USING NATURAL-DRAUGHT TOWER TECHNOLOGY AND OPERATING METHOD

(75) Inventors: Rafael Olavarría Rodríguez-Arango, Seville (ES); Elena Garcia Ramírez, Seville (ES); José Barragan Jiménez, Seville (ES); Raúl Navio Gilaberte, Seville (ES); Lucía Serrano Gallar, Seville (ES)

(73) Assignee: Abengoa Solar New Technologies, S.A., Sevilla (ES)

( * ) Notice: Subject to any disclaimer, the term of this patent is extended or adjusted under 35 U.S.C. 154(b) by 217 days.

(21) Appl. No.: 13/375,731

(22) PCT Filed: Jun. 2, 2010

(86) PCT No.: PCT/ES2010/000245
§ 371 (c)(1),
(2), (4) Date: Feb. 7, 2012

(87) PCT Pub. No.: WO2010/139821
PCT Pub. Date: Dec. 9, 2010

(65) Prior Publication Data
US 2012/0125000 A1    May 24, 2012

(30) Foreign Application Priority Data

Jun. 3, 2009 (ES) .................. 200901349

(51) Int. Cl.
*F03G 6/06* (2006.01)
*F24J 2/07* (2006.01)
(Continued)

(52) U.S. Cl.
CPC . *F24J 2/07* (2013.01); *F03G 6/065* (2013.01); *F24J 2/1047* (2013.01); *F24J 2/16* (2013.01);
(Continued)

(58) Field of Classification Search
CPC ............ F03G 6/00; F03G 6/003; F03G 6/06; F03G 6/065; F03G 6/067; F03G 2006/008; F24J 2/1047; Y10S 261/11; Y02E 10/40–10/47; F28B 1/06
USPC ...................... 60/641.11, 641.8–641.15, 659; 126/541; 122/1 R; 261/DIG. 11
See application file for complete search history.

(56) References Cited

U.S. PATENT DOCUMENTS 1,343,832 A * 6/1920 Kuypers ..................... 454/45
3,304,351 A    2/1967 Sweeney
(Continued)

FOREIGN PATENT DOCUMENTS

DE    29 45 969    5/1981
DE    3142979    6/1983
(Continued)

OTHER PUBLICATIONS

Joseph J. O'Gallagher, Nonimaging Optics in Solar Energy, p. 105, Morgan & Claypool Publishers (2008).*
(Continued)

*Primary Examiner* — Thomas Denion
*Assistant Examiner* — Laert Dounis
(74) *Attorney, Agent, or Firm* — Kilpatrick Townsend & Stockton LLP

(57) ABSTRACT

Solar concentrator plant using natural-draught tower technology, in which the tower is, in turn, used as cooling system. The tower houses saturated or superheated steam receivers in cavities with different orientations, with adaptive dynamic control of the heliostat field in order to direct said receivers towards different focusing points, for the production of electricity, process heat or solar fuels or for use in thermochemical processes.

9 Claims, 3 Drawing Sheets

(51) Int. Cl.
*F24J 2/10* (2006.01)
*F24J 2/16* (2006.01)
*F03G 6/00* (2006.01)
*F24J 2/00* (2014.01)

(52) U.S. Cl.
CPC .... *F03G 2006/008* (2013.01); *F24J 2002/0092* (2013.01); *Y02B 10/20* (2013.01); *Y02E 10/41* (2013.01); *Y02E 10/46* (2013.01)

(56) References Cited

U.S. PATENT DOCUMENTS

| | | | |
|---|---|---|---|
| 3,764,121 A * | 10/1973 | Fordyce | 261/111 |
| 3,922,827 A * | 12/1975 | Rosenblatt | 52/245 |
| 3,979,597 A | 9/1976 | Drucker | |
| 4,212,168 A * | 7/1980 | Bouchard et al. | 60/661 |
| 4,261,147 A * | 4/1981 | Agsten | 52/245 |
| 4,280,449 A | 7/1981 | Kunstle et al. | |
| 4,289,114 A * | 9/1981 | Zadiraka | 126/587 |
| 4,373,512 A | 2/1983 | Hirt | |
| 4,388,785 A * | 6/1983 | Queffelec et al. | 52/222 |
| 4,394,859 A | 7/1983 | Drost | |
| 4,400,946 A * | 8/1983 | Oplatka | 60/641.8 |
| 4,421,102 A | 12/1983 | Posnansky et al. | |
| 4,485,803 A | 12/1984 | Wiener | |
| 4,506,508 A | 3/1985 | Coers et al. | |
| 4,512,336 A | 4/1985 | Wiener | |
| 4,546,758 A * | 10/1985 | Ebernard | 126/635 |
| 4,549,999 A * | 10/1985 | Ernst et al. | 261/109 |
| 4,564,275 A | 1/1986 | Stone | |
| 4,608,964 A | 9/1986 | Russo | |
| 4,779,006 A | 10/1988 | Wortham | |
| 4,935,639 A | 6/1990 | Yeh | |
| 5,072,553 A * | 12/1991 | Bozetto et al. | 52/63 |
| 5,694,774 A | 12/1997 | Drucker | |
| 5,983,634 A | 11/1999 | Drucker | |
| 6,668,555 B1 | 12/2003 | Moriarty | |
| 6,736,134 B2 | 5/2004 | Marko | |
| 6,772,593 B2 | 8/2004 | Dunn | |
| 6,931,851 B2 | 8/2005 | Litwin | |
| 6,981,377 B2 | 1/2006 | Vaynberg et al. | |
| 7,011,086 B2 | 3/2006 | Litwin | |
| 7,172,386 B2 | 2/2007 | Truong et al. | |
| 7,821,151 B2 | 10/2010 | Le et al. | |
| 7,854,224 B2 | 12/2010 | Yangpichit | |
| 7,856,974 B2 | 12/2010 | Yangpichit | |
| 8,186,341 B2 | 5/2012 | Lata Perez | |
| 8,365,719 B2 | 2/2013 | Caldwell | |
| 8,378,280 B2 | 2/2013 | Mills et al. | |
| 8,517,008 B2 | 8/2013 | Plotkin et al. | |
| 8,544,272 B2 * | 10/2013 | Kroizer et al. | 60/641.8 |
| 2006/0016182 A1 * | 1/2006 | Comandu et al. | 60/398 |
| 2006/0026954 A1 | 2/2006 | Truong et al. | |
| 2006/0151154 A1 | 7/2006 | Szabo | |
| 2008/0127647 A1 | 6/2008 | Leitner | |
| 2008/0131830 A1 | 6/2008 | Nix | |
| 2008/0156315 A1 | 7/2008 | Yangpichit | |
| 2008/0156316 A1 | 7/2008 | Yangpichit | |
| 2008/0156317 A1 | 7/2008 | Yangpichit | |
| 2008/0156318 A1 | 7/2008 | Yangpichit | |
| 2008/0302314 A1 * | 12/2008 | Gonzalez et al. | 122/1 R |
| 2009/0038608 A1 | 2/2009 | Caldwell | |
| 2009/0121495 A1 | 5/2009 | Mills | |
| 2009/0212570 A1 | 8/2009 | Le et al. | |
| 2009/0320828 A1 | 12/2009 | Koketsu et al. | |
| 2009/0322089 A1 | 12/2009 | Mills et al. | |
| 2010/0191378 A1 | 7/2010 | Gilon et al. | |
| 2010/0199668 A1 | 8/2010 | Coustou et al. | |
| 2010/0275598 A1 | 11/2010 | Raffaele et al. | |
| 2010/0319678 A1 | 12/2010 | Maemura et al. | |
| 2011/0227236 A1 * | 9/2011 | Vouche et al. | 261/128 |

FOREIGN PATENT DOCUMENTS

| | | | |
|---|---|---|---|
| DE | 10248068 | 5/2004 | |
| EP | 2000669 | 12/2008 | |
| EP | 2000669 A2 * | 12/2008 | F03G 6/06 |
| ES | 2222838 | 2/2005 | |
| JP | 55-142979 | 11/1980 | |
| JP | 55142979 A * | 11/1980 | F03G 7/02 |
| KR | 10-0861567 | 10/2008 | |
| WO | 2007/073008 | 6/2007 | |
| WO | 2007/104080 | 9/2007 | |
| WO | 2008/142459 | 11/2008 | |
| WO | 2008/153922 | 12/2008 | |
| WO | WO 2008154599 A1 * | 12/2008 | |

OTHER PUBLICATIONS

Gould and Kratzig, Cooling Tower Structures, Structural Engineering Handbook, pp. 2-3 of 35, CRC Press LLC, Copyright 1999.*
I. Mungan and U. Wittek, Natural Draught Cooling Towers, pp. 12-13 and 23, Taylor & Francis Group plc, London, UK, 2004.*
J. B. Calvert, The Hyperboloid and its Applications to Engineering, http://mysite.du.edu/etuttle/tech/hyperbo.htm, last revised Mar. 13, 2007, visited Jul. 10, 2014.*
Torres, T. et al. "Cooling Systems for Thermoelectric Plants", Informacion Tecnologica, 2003, vol. 114, No. 2. p. 36-38.
European Office Action mailed on Aug. 8 2014 for application 10783003.6, (PCT/ES2010000245), 8 pages.

* cited by examiner

SOLAR CONCENTRATOR PLANT USING NATURAL-DRAUGHT TOWER TECHNOLOGY AND OPERATING METHOD

TECHNICAL FIELD OF THE INVENTION

The present invention relates to solar concentrator plants using natural-draught system tower technology and physical separation from the evaporator and the superheater, as well as to the dynamic adaptive control of the heliostat-field to produce electricity, process heat, solar fuels or for use in thermochemical processes.

BACKGROUND OF THE INVENTION

Within high concentration solar systems we can distinguish the Stirling dishes, cylinder-parabolic collectors and the technology currently at hand, central receiver technology.

Central receiver systems consist of a heliostat field, these being mirrors of large area (40-125 $m^2$ per unit) so-called solar tracking heliostats, which reflect direct solar radiation on one or more central receivers located at the top of a tall tower. These receivers are usually housed in cavities "excavated" in the actual tower.

Concentrated solar radiation heats a fluid in the receiver, thermal energy of which can then be used for generating electricity.

In central receiver systems the water-steam technology is now the more common, as a heat transfer fluid being used both saturated and superheated steam. The stakes are clear for this type of fluid for two reasons: firstly, one can say with fully firmness that steam is one of the fluids more known in this area, with less technological risk. Secondly, it is the final fluid wherewith a turbine works for the generation of electricity, thereby saving in exchange equipment and eliminating the losses associated with them.

Therefore, for such solar thermal power tower plants, there is needed a location which is attached to the existence of two resources: high solar irradiance and sufficient water supply. Generally those areas that meet high levels of irradiance are areas wherein the water resource is limited, which is why plants in the search of more efficient solar receivers, and with the minimum use of water as possible, the present invention is raised, which is intended to recycle and use the highest amount of water with the lowest possible power consumption.

Currently solar concentrator plants for producing electricity work in the following manner: heliostats reflect solar radiation to the receivers that are at the top of the tower, with that energy a fluid evaporates, said steam is sent to a turbine to produce electricity and at the outlet of the turbine the water steam is tried to be recovered, which is still at an elevated temperature. For such reason, they conduct again the water steam leaving the turbine to a condenser. Through this condenser the tap water circulates at a temperature lower than that of the steam, so that the steam gives up its heat to the tap water being condensed and then pumped to recirculate it back to the receiver.

The tap water flowing through the condenser to cool the steam comes out at a temperature higher than that at the inlet.

In order to reuse this water back into the circuit of the condenser, we must lower the temperature thereof. For such reason, there are currently used forced circulation cooling towers by using large fans which allow air circulation and heat exchange between it and the water. These cooling towers are able to diminish the temperature of hot water coming from the condensation circuit by means of heat and mass transfer to the air flowing through the interior of the tower.

In order to improve the air-water contact, a fabric so-called "padding" is used. Water enters into the tower through the top and is evenly distributed over the padding by using sprays. In this way, an optimal contact between the water and the atmospheric air is achieved.

The padding serves to increase the exchange time and surface between the water and the air. Once the contact between water and air is established, a transfer of heat from the water into the air takes place. This takes place due to two mechanisms: the heat transmission by convection and the steam transmission from the water to the air, with the consequent water cooling due to the evaporation that this entails.

In the heat transmission by convection, a heat flow is produced towards the air surrounding the water because of the difference in temperature between the two fluids.

The evaporative cooling rate is of great magnitude in the cooling towers; about 90% is due to the diffusive phenomenon. When the air contacts with water, a thin film of saturated moist air is formed on the water sheet flowing down through the padding. This is because the partial pressure of water steam within the air film is greater than that of the moist air circulating through the tower, resulting in a transfer of water steam (evaporation). This evaporated mass of water extracts the vaporization latent heat from the liquid itself. This latent heat is transferred to the air, resulting in a cooling of the water and an increase of the air temperature.

These aforementioned systems have several drawbacks such as the power self-consumptions generating the use of fans in the cooling towers and the high water consumption required.

These self-consumptions are formed by the assembly of installation equipments which need power consumption for their operation; thereby this consumption must be subtracted from the raw form produced by the installation. If some progress is made towards more reduced self-consumption equipments, there will be also working in the increase of the profitability of the installation.

In order to reduce the power self-consumption in conventional thermal power plants that so-called natural-draught or hyperbolic-draught towers are used.

The flow of air through the natural-draught tower is mostly due to the difference in density between the inlet fresh air and the outlet warm air. The air expelled from the column is lighter than the atmosphere and the draught is created by the chimney effect, thereby eliminating the need of mechanical fans.

The speed difference between the wind flowing at ground level and the wind flowing through the top of the chimney also helps to establish the air flow. For both reasons, the natural-draught towers have to be high, and they must also have a large cross section to facilitate the movement of rising air. These towers have low maintenance costs and are very suitable for cooling large volumes of water. The average speed of air through the tower is usually between 1 and 2 m/s. This type of natural-draught towers do not used very compact "padding", because the resistance to air flow should be as small as possible.

As mentioned before, these towers are widely used in thermal power plants; wherein despite the construction of the tower supposes a strong investment the creation of this is balanced by lower power consumption.

DESCRIPTION OF THE INVENTION

The invention being currently set forth is a solar thermal power high concentrator plant, with a central receiver or heliostat field tower, wherein the tower is used as a cooling tower by natural-draught.

By using this plant not only reducing the power self-consumption but also the water consumption will be achieved, so that it may be installed in arid areas, such as can be deserts, areas which are extremely favorable for solar energy, but wherein so far has been impossible to install because the water resource is very limited.

The solar plant set forth by the invention consists of a tower surrounded by a field of heliostats that are installed at the top several solar receivers. These can be saturated steam (having evaporators) and/or superheated steam (having superheaters) receivers.

The concept of multi-field and multi-receiver is created in this installation because each receiver operates as an independent system from other receivers and having an associated heliostat field that is, also, independent from other fields.

Thus each of the receiver and heliostat field assembly has a control point strategy for its own. The purpose of freeing the system is to safeguard the integrity of the superheaters and being able to freely arrange the most appropriate field configuration in terms of power sharing during the year.

Thus, it is desirable that superheaters have a position that allows a minimum variation of flows over the year, because these are much more delicate equipments than the evaporators.

Both types of receivers are constructed from a set of layouts arranged according to a specific geometry and consisting of tube bundle itself making up the receiver. The evaporators also take advantage of the natural flow that is generated due to the difference in temperatures between the feed water and the boiler.

All receivers are physically separated and are interconnected through one or more boilers. In general, the boiler receives the outlet of the evaporator and feeds the superheater. Therein the water-vapor separation occurs; therefore it is ensured that the superheater inlet is always dry.

Each receiver is housed inside a hollow or cavity of a module that integrates with the natural-draught tower as a cantilever. These cantilevered modules are arranged around the outer diameter of the tower, being able to surround it completely, in this case there will be a 360° cavity multi-receiver.

The steam extracted from them is transferred to a turbine for producing electricity.

After the turbine, the steam still being at a high temperature has to be condensed and pumped in order to reuse it in new receivers as heat transfer fluid.

In order to cool the steam, a system that solves two of the drawbacks aforementioned: the high power consumption (caused by using fans in forced cooling towers) and the large amount of water required, has been devised.

As mentioned above, this type of solar plant has several high receivers that remain lifted on a tower in order to thus obtain good yields from the solar field. Thus, the present invention sets forth producing a natural draught that evacuates the heat transferred by the condenser of system towards the atmosphere through the tower, without making any extra investment, since our system already has the tower that may be exploited as a natural-draught cooling tower.

Such tower has at its base a series of heat exchangers, specifically condensers mission of which is to condense the steam coming from the exhaust of the turbine under conditions close to the saturation, and evacuating the heat from the condensation to the outside.

The fluid to be used for carrying out this heat exchange will be the air at room temperature that is at the tower base and cooling the steam flowing through the condenser tubing. That is, the steam extracted from the turbine at high temperature is cooled by the stream of air flowing over the condenser.

This steam, once condensed, is pumped back to the receiver in order to be reused as a heat transfer fluid.

The air at room temperature that is at the tower base, and which is responsible for lowering the temperature of the steam, is lifted along the tower due to the natural-draught thereof and comes out again into the atmosphere through the top.

In order to further facilitate this natural-draught effect in question, the tower of the invention under consideration has a hyperbolic and hollow structure design, so as to produce a current of rising air throughout for cooling the steam by natural convection, incentive for having a hot focus, such as the receivers, at the top of the tower.

By using the solar tower as cooling tower, the tower has a dual function: housing the receivers at the height required for concentrating the radiation and using it as cooling tower.

In this way it manages to reduce the water consumption due to the elimination of the need for a cooling circuit, which cools with air and not water, and also prevents the construction of additional cooling towers thus reducing the overall cost of the plant.

The tower of our heliostats field have the height needed to concentrate the solar energy reflected by the heliostats field on a focus or focal point located at the top thereof, thus minimizing losses due to the cosine effect (angle formed between the incident beam with the normal to the heliostat, and which makes it not see the sun in its entirety). Regarding the building materials of the natural-draught tower, there should be noted that this may be made of concrete, steel or similar material.

These are tower heights above 100 m, this being high enough to facilitate the use of the tower for this natural-draught effect.

In the absence of this natural-draught, there should be made use of either conventional water cooling towers, or air cooling towers driven by large fans. The first of these alternatives would also involve a non-negligible self-consumption, which water consumption would be approximately 40% of the total solar installation (including the cleaning water of the solar field). The second option would associate an excessive self-consumption.

Thus, the air-cooling by natural-draught through the solar tower provides greater energy efficiency for the plant due to the reduction of the power consumption, in addition to the elimination of water use during cooling.

The fact of designing this tower in a hollow manner for its use as a natural-draught tower requires us to devise another way to house the receivers so that these do not stand in the way of the exit of air, as in the towers existing in the state of the art the receivers are located in interior cavities, which would greatly hinder the exit of air.

For such reason there is conceived the use of balconies or cantilevers that include the different cavities or receivers, so that the equipments do not hinder the natural-draught effect for the cooling achieved with the tower.

These receivers may be saturated steam and superheated steam receivers independently located in various balconies and cantilevers.

Furthermore, in order to go to a high-power plant commercially interesting (approximately 50 MWe), the heliostat field required for this type of large-scale power plants tend to field configurations with a large number of heliostats.

If the orientation of this field is North, the tower of the solar plant presented here has three cavities oriented in the following manner:

Southeast Facing Direction: cavity with one or more saturated steam receivers.

Southwest Facing Direction: cavity with one or more saturated steam receivers.

North Facing Direction: cavity with multiple superheated steam receivers.

If the choice is a field of circular configuration, the tower of the solar plant has four cavities oriented in the following manner:

East Cavity: cavity with one or more saturated steam receivers.

West cavity: cavity with one or more saturated steam receivers.

North cavity: cavity with one or several superheated steam receivers.

South Cavity: cavity with one or several superheated steam receivers or intended as economizer for preheating water.

Thus, the solar thermal power plant being proposed would have three or four focal points in different directions depending on the chosen number of cavities.

In addition, in either of the two heliostat field configurations described (North or circular), the receiver design will be made taking into account a control point strategy by the heliostat field, so that some of these are intended to be focused to a cavity or another depending on the situation of the heliostat in the field and the thermal power and concentration requirements for each receiver, whether it be saturated or superheated steam receiver. The number of heliostats in the field intended to point each cavity will condition the geometry of each receiver and the number of flat tubes by which these will be made up, if that is the type of chosen receiver.

The combination of saturated and superheated steam receivers in the system allows us to produce steam at different temperatures, in saturated steam receivers temperatures of about 300° C. will be obtained, being able to carry this steam to the superheated steam receiver or receivers, thus having steam at higher temperatures (approximately 540° C.) and thus achieving greater efficiencies in the turbine.

Furthermore, in order to manage the steam generated and having an input from this when the sun is not shining, the plant includes a storage system either by water-steam or by molten salts tanks.

The storage system using water-vapor is composed of metal, concrete or similar materials tanks having a spherical or any other configuration, properly grounded and isolated that store saturated steam under high pressure conditions (100 bar and 140 bar).

With the storage system several objectives are achieved: extending the production during night periods, allowing its continuous operation of the turbine during cloud periods and enabling an interrupted production over night for a number of days, so that thermal stresses associated with start and stop cycles are reduced.

BRIEF DESCRIPTION OF DRAWINGS

To complete the description being made and in order to help to a better understanding of the features of the invention, as an integral part of this description, a set of drawings is attached, in which by way of illustration and not limitation, the following has been represented.

Figure 1:
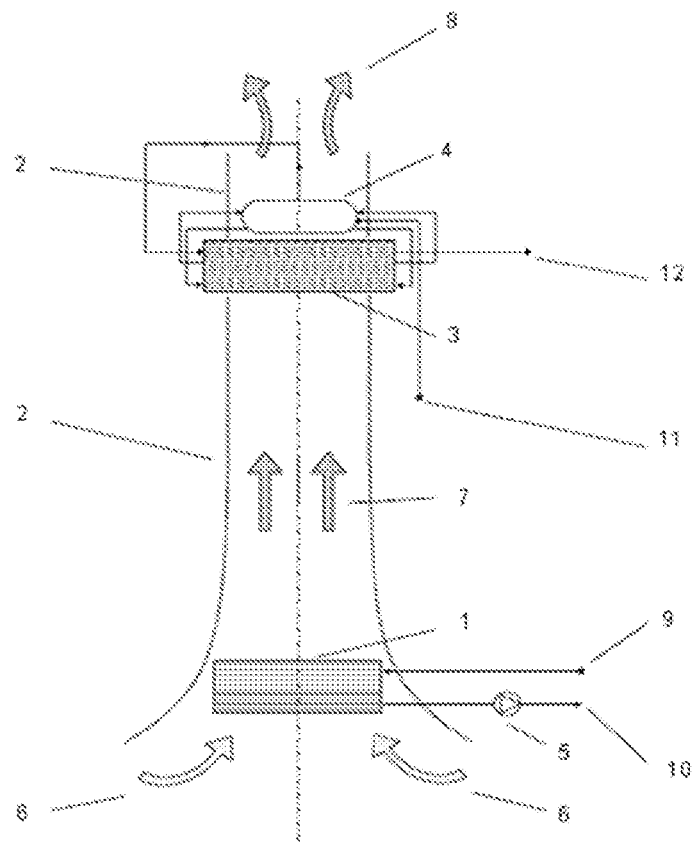
FIG. 1: Overview scheme of a natural-draught cooling tower

Wherein the references represent:

1. Condenser
2. Solar Chimney
3. Solar Receiver
4. Boiler
5. Feed pump to the turbine
6. Air inlet
7. Air flow in natural circulation
8. Air Outlet
9. Steam turbine outlet
10. Feed water to preheaters
11. Feed water to Boiler
12. Turbine inlet steam
13. North Cavity
14. East Cavity
15. West cavity
16. North focused Heliostats
17. Southeast focused Heliostats
18. Southwest focused Heliostats
19. East Cavity
20. West Cavity
21. South Cavity
22. East focused Heliostats
23. West focused Heliostats
24. South focused Heliostats
25. System for storing thermal energy
26: Cantilevered module

PREFERRED EMBODIMENT OF THE INVENTION

In order to achieve a better understanding of the invention now is described the operation of the tower, as well as the different locations of the heliostats.

FIG. 1 shows the configuration of a solar tower with natural-draught cooling.

The tower or chimney (2) of hyperbolic geometry is provided at its top with a series of balconies or cantilevers that house the different receivers (3) on which the solar radiation is reflected by the heliostats. The heliostats are subjected to different point control strategies to meet the requirements on thermal power and concentration required for each receiver.

Said receivers (3) may be of saturated or superheated steam. If it is a saturated steam receiver, through the evaporator tubes will circulate the water heated by solar radiation. At the evaporator outlet the saturated vapor taken to the boiler (4) is obtained. In the boiler (4) the water-steam separation is produced, so that the dry steam obtained therefrom passes to the superheater, which by using solar radiation will raise its temperature even further. The superheated steam (12) obtained therefrom is introduced into the turbine (not shown in the figure) in order to generate electricity.

Once the steam has passed through the turbine, it is recovered in order to introduce it again into the circuit and can be used as a heat transfer fluid again. For such reason, it requires to be condensed, and thus pumping the water back to the receiver (3).

Thus, steam is circulated (9) through the pipes of the condenser (1) being cooled by the air stream (6) flowing on said pipes. By raising the temperature of the air (6), this is raised (7) by action of the natural-draught chimney (2) and comes out at the top thereof (8). The condensed steam and already converted into water (10) at the outlet of the condenser (1) is pumped (5) to the receivers (3) found at the top of the tower, in order to restart the cycle.

Figure 2:
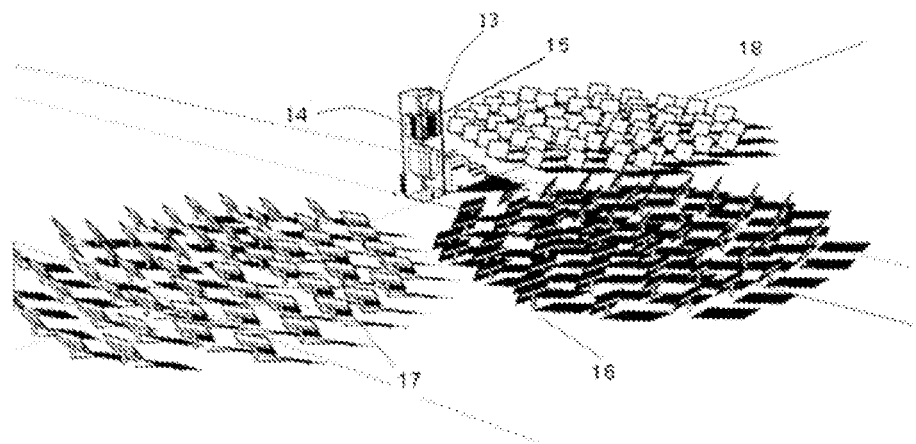
FIG. 2: Field of heliostats and tower of three cavities
Figure 3:
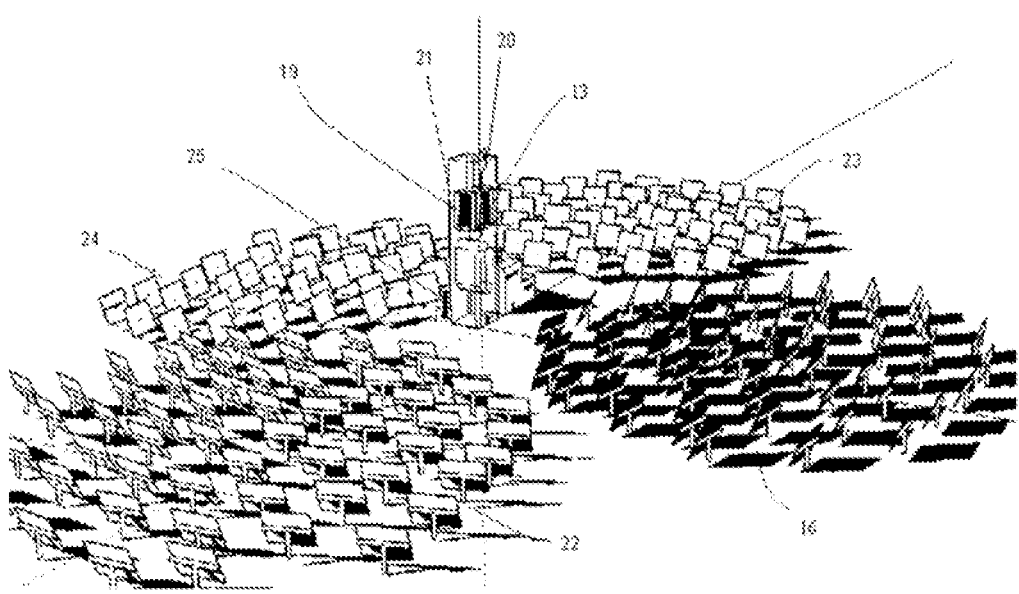
FIG. 3: Field of heliostats and tower of four cavities
Figure 4A:
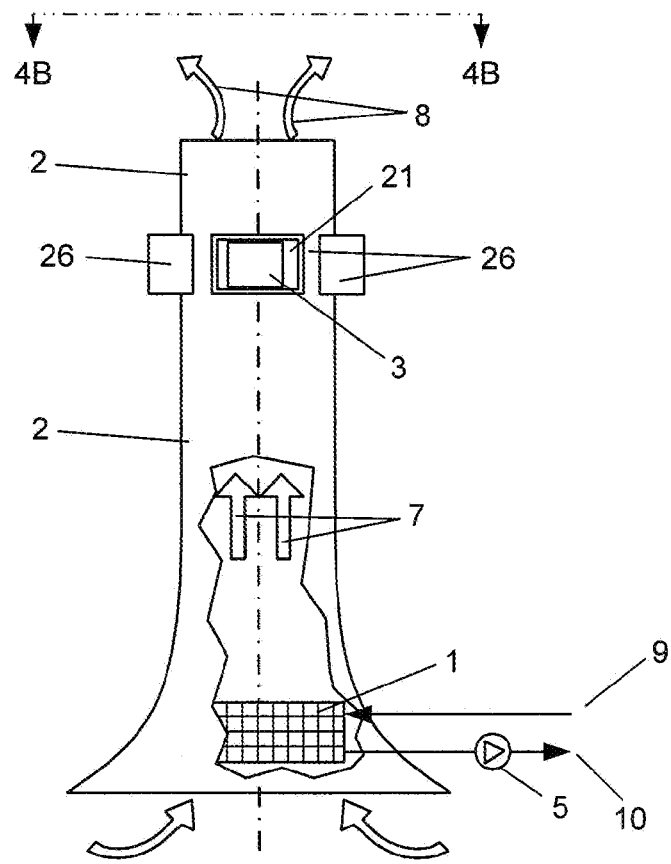
FIG. 4A: Side view of tower having cantilevered modules
Figure 4B:
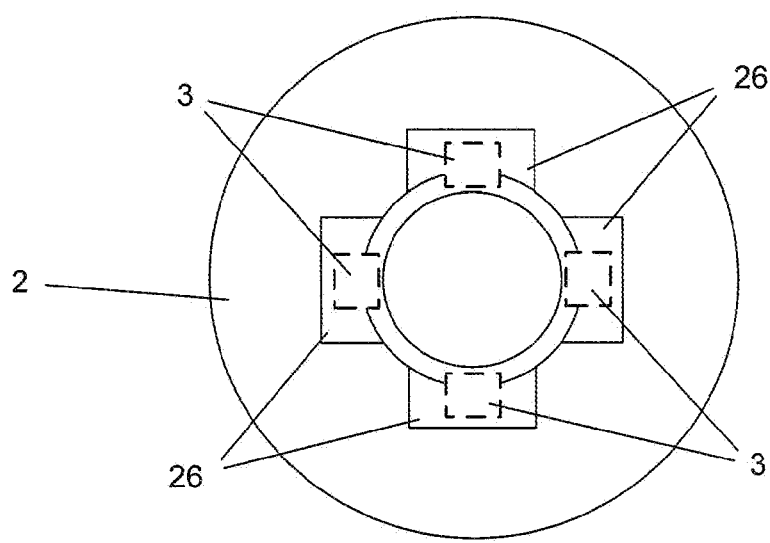
FIG. 4B: Top view of tower having cantilevered modules

In relation to the field of heliostats, for such large-scale power plants field configurations with a large number of heliostats and different orientations are required, such as shown in FIGS. 2 and 3.

If the orientation of this field is North, the tower of the solar plant presented here has three cavities oriented in the following manner, and which are shown in FIG. 2:

Southeast Cavity (14) with one or more saturated steam receivers.

West cavity (15) with one or more saturated steam receivers.

North cavity (13) with one or more superheated steam receivers.

If the choice is a field of circular configuration, the tower of the solar plant has four cavities oriented in the following manner, and which are shown in FIG. 3:

East cavity (19) with one or more saturated steam receivers.

West cavity (20) with one or more saturated steam receivers.

North cavity (13) with one or more superheated steam receivers.

South Cavity (21) with one or more superheated steam receivers or intended as economizer for preheating water.

Thus, the solar thermal power plant being proposed would have three or four focal points in different directions depending on the chosen number of cavities.

In addition, in any of the two described heliostat field configurations (North or circular), the receiver design will be made taking into account a control point strategy by the heliostat field, so that some of these are intended to be focused to a cavity or another depending on the situation of the heliostat field and the thermal power and concentration requirements for each receiver, whether it be a saturated or superheated steam receiver.

Therefore, there will be heliostat field with North facing direction (16), Southeast facing direction (17), southwest facing direction (18), South facing direction (24), East facing direction (22) and West facing direction (23). In addition, in order to manage the steam produced and having a contribution therefrom when the sun is set, the plant includes a storage system (25) whether by water-steam tanks or by using molten salts.

The invention claimed is:

1. A solar concentrator plant using natural-draught tower technology, comprising:
   a field of heliostats reflecting solar radiation; and
   a hollow tower tall enough to minimize a cosine effect, the hollow tower including:
      a hyperboloid structure;
      at least one condenser surrounded by air at room temperature within a base of the hollow tower, wherein the condenser is cooled by the room temperature air, which moves upward through the tower due to natural draught;
      a plurality of solar receivers located at a top of the hollow tower;
      a plurality of cantilevered modules including a plurality of cavities within the cantilevered modules at an upper final section of the tower, wherein the plurality of cavities house the solar receivers and are integrated with the hollow tower, such that equipment within the cavities does not hinder the natural-draught effect for the cooling of the condenser;
      each of the plurality of solar receivers is independently located in each of the cantilevered modules having different orientations, so as to allow independent point control strategies of the heliostat field having several focal points for different cavities.

2. The solar concentrator plant using natural-draught tower technology according to claim 1, further comprising:
   saturated steam receivers disposed in the cantilevered modules;
   superheated steam receivers disposed in the cantilevered modules; and
   a boiler as a connection between the saturated steam receivers and the superheated steam receivers.

3. The solar concentrator plant using natural-draught tower technology according to claim 2, wherein:
   the heliostat field is oriented North, and
   the plurality of cavities include three cavities oriented as follows in order to maximize steam production:
      a Southeast cavity that includes at least one of the saturated steam receivers;
      a West cavity that includes at least one of the saturated steam receivers; and
      a North cavity that includes at least one of the superheated steam receivers.

4. The solar concentrator plant using natural-draught tower technology according to claim 2, wherein:
   the heliostat field has a circular configuration,
   the cantilevered modules are arranged around an outer diameter of the hollow tower, and
   the plurality of cavities include four cavities oriented as follows, in order to maximize steam production:
      an East cavity that includes at least one of the saturated steam receivers;
      a West cavity that includes at least one of the saturated steam receivers;
      a North cavity that includes at least one of the superheated steam receivers: and
      a South cavity that includes at least one of the superheated steam receivers.

5. The solar concentrator plant using natural-draught tower technology according to claim 1, further comprising a storage system.

6. A method for operating of a solar concentrator plant using natural-draught tower technology as that described in claim 1, comprising:
   directing water heated by solar radiation through tubes of an evaporator in a steam receiver;
   obtaining saturated steam at approximately 300° C. at an evaporator outlet;
   transferring the saturated steam to a boiler;
   obtaining dry steam in the boiler by water-steam separation;
   directing the dry steam from the boiler to a superheater;
   obtaining superheated steam by raising the temperature of the dry steam up to approximately 540° C. in the superheater by using solar radiation;
   directing the superheated steam into a turbine in order to generate electricity;
   directing the superheated steam that has passed through the turbine to pipes of a condenser;
   obtaining condensed steam by cooling the superheated steam by a stream of air flowing along the pipes of the condenser, wherein the temperature of the stream of air is increased in the condenser; the stream of air rising by an action of a natural-draught chimney of the hollow tower, exiting the hollow tower through a top of the hollow tower; and the condensed steam exiting the condenser as water through an outlet of the condenser; and pumping the water to the receivers at the top of the hollow tower.

7. The solar concentrator plant using natural-draught tower technology according to claim 5, wherein the storage system comprises spherical tanks.

8. The solar concentrator plant using natural-draught tower technology according to claim 7, wherein the spherical tanks include water-vapor tanks.

9. The solar concentrator plant using natural-draught tower technology according to claim 7, wherein the spherical tanks include molten salts tanks.

* * * * *